United States Patent
Kim

(10) Patent No.: US 9,985,454 B2
(45) Date of Patent: May 29, 2018

(54) POWER SOURCE DEVICE HAVING STANDBY POWER-CUTOFF FUNCTION, AND METHOD FOR CONTROLLING SAME

(71) Applicant: MILPROS CO., LTD., Hwaseong, Gyeonggi-Do (KR)

(72) Inventor: Chang-Ho Kim, Seoul (KR)

(73) Assignee: MILPROS CO., LTD., Hwaseong, Gyeonggi-do (KR)

( * ) Notice: Subject to any disclaimer, the term of this patent is extended or adjusted under 35 U.S.C. 154(b) by 205 days.

(21) Appl. No.: 14/509,730

(22) Filed: Oct. 8, 2014

(65) Prior Publication Data

US 2015/0022154 A1    Jan. 22, 2015

Related U.S. Application Data

(63) Continuation of application No. PCT/KR2013/002965, filed on Apr. 9, 2013.

(30) Foreign Application Priority Data

Apr. 9, 2012  (KR) .................. 10-2012-0036490
Apr. 20, 2012  (KR) .................. 10-2012-0041238

(51) Int. Cl.
*H01H 7/00*    (2006.01)
*H02J 7/00*    (2006.01)
(Continued)

(52) U.S. Cl.
CPC ............ *H02J 7/007* (2013.01); *H02J 7/0054* (2013.01); *H01M 10/44* (2013.01); *H01M 10/48* (2013.01);
(Continued)

(58) Field of Classification Search
CPC ................. H02J 7/0044; Y02E 60/02
(Continued)

(56) References Cited

U.S. PATENT DOCUMENTS 5,723,970 A * 3/1998 Bell .................. H01M 10/46
                                          320/140
6,091,229 A    7/2000 Oglesbee et al.
(Continued)

FOREIGN PATENT DOCUMENTS

JP    2002-125315 A    4/2002
JP    2002-186178 A    6/2002
(Continued)

OTHER PUBLICATIONS

CN Office Action dated Jul. 1, 2016 in the corresponding Chinese Patent Application No. 201380030241.4.

*Primary Examiner* — Nathaniel Pelton
*Assistant Examiner* — Johali Torres Ruiz
(74) *Attorney, Agent, or Firm* — Mintz Levin Cohn Ferris Glovsky and Popeo, P.C.; Kongsik Kim; Colleen H. Witherell

(57) ABSTRACT

Disclosed is a power source device having a standby power-cutoff function, which is to be used to charge a battery. The power source device comprises: a micro-USB connector (24) for connecting to the power source unit (20) of a smartphone when the battery of the smartphone or the like is to be charged; and a power generation unit (32) supplying DC charging power to the smartphone (20) from an AC input power source. The present invention includes: a control unit (33) having at least one microprocessor for controlling the overall operation and functioning of a power source device (30); a power supply/cutoff unit (34) supplying/cutoff the AC input power to the power generation unit (32) according to the control of the control unit (33); and a current-sensing unit (CT) connected so as to monitor the current from the power supply/cutoff unit (34), provide the control unit (33) with the current, and provide an indication of the charging state of the battery. The power source unit (20) of the smartphone also includes a first backflow-preventing unit (22) connected between the battery (21) and the control unit (33) so as to prevent the DC power from the power source device (30) from being directly applied to the battery (21) during charging, and the power source device (30) further includes a second backflow-preventing unit (31) which is
(Continued)

connected between the DC charging voltage output terminal of the power generation unit (32) and the power supply voltage (Vc) of the control unit (33).

5 Claims, 4 Drawing Sheets

(51) Int. Cl.
    *H01M 10/44*     (2006.01)
    *H01M 10/48*     (2006.01)

(52) U.S. Cl.
    CPC .................. *H02J 2007/0059* (2013.01); *H02J 2007/0062* (2013.01)

(58) Field of Classification Search
    USPC ......................................................... 320/114
    See application file for complete search history.

(56) References Cited

U.S. PATENT DOCUMENTS

| | | | | |
|---|---|---|---|---|
| 2003/0204761 | A1* | 10/2003 | D'Alessio | G06F 1/3218 713/320 |
| 2009/0096417 | A1* | 4/2009 | Idzik | H02J 7/0044 320/115 |
| 2011/0304301 | A1* | 12/2011 | Kim | H02J 7/0042 320/115 |
| 2012/0187897 | A1* | 7/2012 | Lenk | H01M 10/44 320/101 |

FOREIGN PATENT DOCUMENTS

| | | | | |
|---|---|---|---|---|
| JP | 2002-199612 A | 7/2002 | | |
| KR | 10-2010-0082063 A | 7/2010 | | |
| KR | 10-1024381 B1 | 3/2011 | | |
| WO | WO 2011159066 A2 * | 12/2011 | | H02J 9/005 |

\* cited by examiner

POWER SOURCE DEVICE HAVING STANDBY POWER-CUTOFF FUNCTION, AND METHOD FOR CONTROLLING SAME

CROSS-REFERENCE TO RELATED APPLICATIONS

This application is a continuation of International Application No. PCT/KR2013/002965 filed on Apr. 9, 2013, which claims priority to Korean Patent Application No. 10-2012-0036490 filed on Apr. 9, 2012 and Korean Application No. 10-2012-0041238 filed on Apr. 20, 2012. The applications are incorporated herein by reference.

TECHNICAL FIELD

The present invention relates to a power source device for supplying electric power for charging an electronic product such as a mobile phone and smartphone having a battery and a charging device therein, and more particularly to a power source device having a function of automatically completely cutting of standby power even though the power source device is not separated from a receptacle if a battery is fully charged or a product is separated, and a method of controlling the same.

BACKGROUND ART

According to recent statistics of the International Energy Agency (IEA), it is known that at least 10% of average domestic power consumption of OECD nations is wasted as standby electric power. Standby electric power refers to electric power which is continuously consumed for any reason even when electronic devices are not used while power plugs of the electronic device are generally connected to receptacles. In recent years, effective cutoff of standby electric power is becoming one of the most important problems in increasing energy efficiency of various electronic devices.

Currently, the number of charging devices used worldwide is enormous, and it is known that when it comes only to mobile phones, about 4.8 billion charging devices are used. When the number of charging devices for various electric tools is added, the total number of charging device cannot be imagined. In more detail, for example, when it is assumed that a time period for which a user does not actually use a charging device in a day is 20 hours and the charging device is continuously inserted into a receptacle, standby power of about 0.5 W may be wasted on average for each charging device, in which case electric power of about 2.4 GWH is wasted in a day before the user knows. Accordingly, corresponding standby power is wasted, and economic loss is nationally caused to produce electric power unnecessarily wasted in this way and carbon dioxide is consistently generated due to use of fossil fuels, which may ultimately cause various problems such as environmental contamination.

According to the related art, if a power source device is separated from a receptacle even though a smartphone is fully charged or separated, standby power is generated in the power source device, wasting unnecessary power.

Korean Patent No. 10-1024381 of the applicant relates to a power supply device including a standby power cutoff structure, and discloses a power supply device which can completely cut off standby power even when a plug is not withdrawn if a battery of an electronic product is fully charged or a power source of an electronic product is switched off. However, because the patent has a structure in which a switch is connected to supply electric power when a connector is connected to connect an electronic product to a power source device so that it is inevitably necessary to add a mechanical switch, the size of a connection unit becomes large. In addition, because a switch element is added, manufacturing costs of the product increase. In addition, in the patent, although a power source device should be connected to an electronic product (for example, a laptop computer or a tablet PC) and a power switch of the electronic product should be switched on to operate an adapter (power source device), the user feel rather inconvenienced because the power source device starts to supply electric power.

Korean Patent No. 10-1178193 (Korean Patent Application Publication No. 10-2010-0082063) of the applicant discloses a receptacle device having a function of automatically cutting of standby power and a method of controlling the same. In the patent, because it cannot be recognized when a signal will be input again even if electric power of a product is cut off and a sleep mode is started, a wake-up mode should be performed again within at least one second. Accordingly, although power directly consumed in a receptacle of the power source device can be reduced, wasted electric power cannot be still ignored.

SUMMARY

Accordingly, the present invention has been made in an effort to solve the above-mentioned problems, and provides a power source device which can be automatically supplied with electric power if a smartphone is connected to a micro USB connector of the power source device to be charged while the micro USB connector employs an existing standard micro USB connector, and can perfectly cut off standby power by automatically cutting off input power of the power source device if a product is separated from the power source device or the battery is fully charged during charging, and a method for controlling the same.

The present invention also provides a power source device which can be automatically supplied with electric power if a smartphone is connected to a micro USB connector of the power source device to be charged while a standard signal of an existing micro USB connector is still used, and can perfectly cut off standby power by automatically cutting off input power of the power source device if a product is separated from the power source device or the battery is fully charged during charging, and a method for controlling the same.

The present invention also provides a charging device for a smartphone which allows the smartphone to send and receive data while the smartphone is charged by using a USB port of a computer.

According to the present invention, electric power is automatically supplied to a power source device such that the power source device is operated to supply charging power as long as a smartphone is connected to the power source device directly using a micro USB connector, which is an international standard, and if a battery of the smartphone is fully charged or the power source device is separated from the smartphone, the state is detected through a current to automatically cut off electric power of the power source device, whereby standby power of the power source device can be conveniently cut off even though the user does not separate the power source device from a receptacle.

Accordingly, waste of energy can be prevented by efficiently completely cutting off standby power which has been wasted according to the related art.

DETAILED DESCRIPTION

Figure 1:
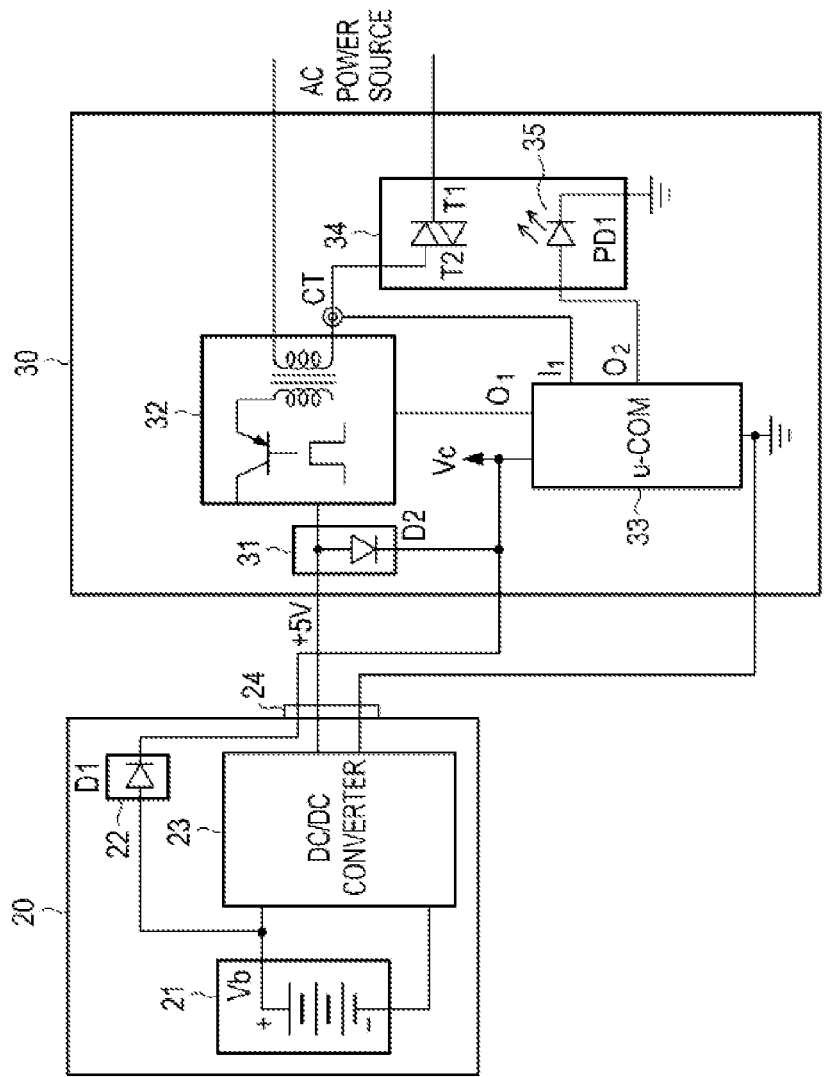
FIG. 1 is a circuit diagram exemplifying a circuit configuration of a power source device for cutting off standby power and a power source unit of a smartphone according to a first embodiment of the present invention.

In accordance with an aspect of the present invention, there is provided a power source device for charging a battery of a smartphone, which has a standby power cutoff function, the power source device including a micro USB connector 24 for connection to a power source unit 20 of the smartphone when the battery of the smartphone is charged, and a power generation unit 32 for supplying DC charging power from an AC input power source to the smart phone 20, the power source device further including: a control unit 33 including at least one microprocessor for controlling an overall operation and an overall function of the power source device 30; a power supply/cutoff unit 34 for performing a function of supplying/cutting off AC input power to and from the power generation unit 32 under the control of the control unit 33; and a current detection unit CT connected to the controller 33, for sensing a current in the power supply/cutoff unit 34 and transmitting the sensed current to the controller 33 to inform the controller 33 of a charging state of the battery, wherein the power source unit 20 of the smart phone includes: a rechargeable battery 21, a DC/DC converter 23 as a unit for providing a charging voltage for the battery, and a first backflow prevention unit 22 connected between the battery 21 and the control unit 33, for preventing DC power from the power source device 30 from being directly applied to the battery 21 during charging of the battery, and the power source device 30 includes a second backflow unit 31 connected to an output terminal of the DC charging voltage of the power generation unit 32 and a power voltage Vc of a microprocessor µ-COM of the control unit 33.

Preferably, the power supply/cutoff unit 34 is configured by combining at least one photo triac/triac T1 and T2, a photodiode PD1, and/or a relay.

Preferably, each of the first and second backflow prevention units 22 and 31 includes at least one diode D1/D2.

The power source device 30 controls an on/off state of the photodiode PD1 according to an output signal from an output terminal O2 of the microprocessor µ-COM of the control unit 33 whereby supply/cutoff of AC input power to and from the power generation unit 32 is adjusted by controlling an on/off state of the triac T1 and T2).

In accordance with another aspect of the present invention, there is provided a method of controlling a normal operation of a battery charging power source device including a micro USB connector 24 connecting the battery to a power source unit 20 of the smartphone when the battery of the smartphone is charged, a power generation unit 32 for supplying DC charging power from an AC input power source to the smart phone 20, and a control unit 33 including at least one microprocessor for controlling an overall operation and an overall function of the power source device 30, wherein if a current detection unit CT of the power source device 30 senses a flowing current and inputs the sensed current to an input port I1 of the control unit 33, the control unit determines that the battery is fully charged if the sensed current is lower than a predetermined level of a completely charged current, outputs an output O2 of the control unit to be low, switches off a photodiode PD1 of the power supply/cutoff unit 35, and performs a control to convert a state of a triac T1 and T2 into an open state, whereby standby power of the power source device 30 is cutoff by cutting off AC input power.

Preferably, the power source device 30 further includes a means for preventing electric power of the battery from being supplied to the DC/DC converter and discharged because a DC voltage may not be output if the battery is fully charged by configuring the power source device 30 such that a power voltage Vc necessary for an operation of the control unit 33 is supplied through the backflow prevention unit 22 if a DC charging voltage is output by supplying AC power, In accordance with another aspect of the present invention, there is provided a power source device for charging a battery of a smartphone, which has a standby power cutoff function, the power source device including a micro USB connector 46 for connection to the smartphone when the battery 41 of the smartphone is charged, a micro USB plug 45 coupled to the micro USB connector 46 and acting as a passage for supplying charging power, a power generation unit 53 for supplying DC charging power from an AC input power source to the smart phone, and a DC/DC converter 42 for supplying a charging voltage to the battery, the power source device further including: a control unit 51 including at least one microprocessor µ-COM for controlling generation of electric power of the power source device 50 and detecting a charging state of the battery 41 to analyze, determine, and control the charging state of the battery 41; a power supply/cutoff unit 52 for supplying or cutting off electric power under the control of the control unit 51; a current detection unit CT connected to an input terminal I1 of the control unit 51, for detecting a current of charging AC supply power to detect a charging state of the battery and providing the detected current to the input terminal I1 of the control unit 51; a second backflow prevention unit 54 for preventing electric power from being discharged from the battery 41 when a power input to the power source device 50 is cut off; a charging voltage supply unit 44 for determining whether a supplied voltage is a charging voltage or a battery voltage Vb to supply or cut off electric power to or from the DC/DC converter 42; and a first backflow prevention unit 43 for preventing electric power from reversely flowing to the battery when a voltage of +5 V is supplied from the power source device 50.

EMBODIMENTS

A power source device having a function of cutting off standby power and a method of controlling the power source device according to embodiments of the present invention will be described in detail with reference to the accompanying drawings. Names of specific elements such as a smartphone, a backflow prevention part, a power generation part, a driving part, a microprocessor, a battery, a DC/DC converter, a micro USB, a power supply/cutoff part, a current detection part, a CT, a switch, and a cable are referred to in a detailed description of the following specific embodiments, but they are provided to help general understanding of the present invention and the present invention is not limited thereto. It will be appreciated by those skilled in the art to which the present invention pertains that the specific details may be modified or changed by using elements having similar functions as long as they do not depart from the spirit of the present invention defined in the claims of the present invention.

Hereinafter, a configuration and an operation of the power source device having a function of cutting off standby power according to the present invention will be described in detail with reference to the accompanying drawings.

First Embodiment

FIG. 1 is a circuit diagram exemplifying a circuit configuration of a power source apparatus for cutting off standby power and a power source unit of a smartphone according to a first embodiment of the present invention.

Referring to FIG. 1, a configuration of the present invention will be described as follows. A power source unit 20 of a mobile phone, for example, a smart phone includes a rechargeable battery 21, a DC/DC converter 23 as a unit for providing a charging voltage for charging a battery, and a first backflow prevention unit 22 connected to the battery 21. If the power source unit 20 of a smartphone and a micro USB 24 connector of a power source device 30 are connected to each other, a battery voltage Vb is applied to a microprocessor μ-COM of a control unit 33 to provide a power source voltage for an operation of the power source device 30, and the first backflow prevention unit 22 includes at least one diode D1 in order to prevent DC power from the power source device 30 from being directly applied to the battery 21 during a charging operation.

As shown in FIG. 1, the power source device 30 includes a micro USB 24 connector for connection to the power source unit 20 of the smartphone (may be replaced by another type of connector), a control unit 33 including a microprocessor μ-COM for controlling an overall operation of the power source device 30, a power supply/cutoff unit 34 for performing a function of supplying and cutting off an input AC power under the control of the control unit 33, a power generation unit 32 for applying supply power to the smartphone 20 under the control of the control unit 33 if electric power is supplied, and a current detection unit CT for informing the control unit of a battery charging state by sensing a current from the power supply/cutoff unit 34. The power supply/cutoff unit 34 may be configured by combining, for example, a phototriac/triac T1 and T2, a photodiode PD1, and/or a relay, and the configuration shown in FIG. 1 shows an example of controlling an on/off state of the photodiode PD1 according to an output signal from an output terminal O2 of the microprocessor μ-COM of the control unit 33, and controlling on/off states of the triac T1 and T2 to adjust application of AC power to the power generation unit 32.

The power source device 30 according to the first embodiment of the present invention includes a second backflow prevention unit 31 including a diode D2 connected between an output terminal of a charging current of the power generation unit 32 and a power voltage Vc of the microprocessor of the control unit 33, and the second backflow prevention unit supplies a power voltage through the diode D2 connected forwardly to the power voltage Vc of the microprocessor during a normal operation of the power source device 30, and also prevents the battery voltage Vb from being fed back to the DC/DC converter 23 through the first backflow prevention unit 22 when the battery is fully charged and input power is cut off.

Hereinafter, an operational principle and a control method of the above-configured power source device 30 according to the present invention shown in FIG. 1 will be described. First, in a process of automatically supplying electric power while AC input power of the power source device 30 is cut off, a voltage Vb left in the battery 21 is supplied to a Vc terminal of the control unit 33 of the power source device 30 through the first backflow prevention unit 22 if the micro USB 24 is connected to a power source unit of the smartphone 20. Then, as the microprocessor μ-COM of the controller 33 is operated, a high signal is sent through an output terminal O2 of the microprocessor μ-COM such that a current flows to the photodiode PD1 of the power supply/cutoff unit 34 to switch on the diode. Although the power supply/cutoff unit 34 employs a photo triac in the shown example, the same function may be realized with a triac or a relay. If the triac T1 and T2 are turned on by light emitted from the diode, AC input power is supplied through the power supply/cutoff unit 34 such that DC power for charging electric power to supply the electric power from the power generation unit 32 to the smartphone 20 is generated to be supplied to the DC/DC converter 23. The DC power voltage is also supplied to a power terminal Vc of the control unit 33 through the second backflow prevention unit 31. A current flows to the battery as the DC power voltage is higher than the battery voltage Vb, and then the first backflow prevention unit 22 functions to prevent electric power from reversely flowing to the battery.

Meanwhile, in a normal operation step of the power source device 30 according to the present invention, the controller 33 of the power source device 30 controls the power generation unit 32 to constantly supply an output voltage to the DC/DC converter 23, and the DC/DC converter 23 converts the output voltage into a charging voltage necessary for charging the battery of the smartphone to supply the charging voltage to the battery 21, thereby continuing a battery charging operation.

Then, the current detection unit CT of the power source device 30 detects a flowing current and inputs the detected current to an input I1 of the control unit 33, so that if the detected current is lower than a predetermined completely charged current (hereinafter, referred to as 'Cs1'), the control unit 33 determines that charging is completed and controls such that an output O2 thereof is output to be low such that the microprocessor μ-COM switches off the photodiode PD2 of the power supply/cutting unit 34, whereby the triac T1 and T2 are opened to cut off supply of AC power and accordingly, consumption of standby power of the power source device is completely cut off.

Meanwhile, if input power of the power source device 30 is cut off, an output voltage of the power source device is cut off but a power source voltage Vb of the fully charged battery 21 is supplied through the first backflow prevention unit 22. Accordingly, a flow of a current is cut off by the diode D2 of the second backflow prevention unit 31 such that the electric power can be prevented from being supplied to the DC/DC converter 23 to be discharged, and the battery can be minimally discharged by maintaining the state of the microprocessor μ-COM in a sleep mode to minimize power consumption of the microprocessor μ-COM.

Here, the microprocessor μ-COM of the control unit 33 may be realized, for example, by using a low power microcomputer of Texas Instruments Inc., and because a current consumed in a sleep mode of the model is about 1 μA or less and power consumption of the charged battery may be assumed to be 1000 mAh, a total in-use time may be one million hours (about 115 years). Accordingly, an amount of discharged current in a sleep mode may be ignored.

If the smartphone 20 is separated from the power source device 30 while the user performs a charging operation using the charging device according to the present invention, a current detected by the current detection unit CT is lower than a fully charged current Cs1, and thus standby power is cut off through the above-described control.

Second Embodiment

Figure 2:
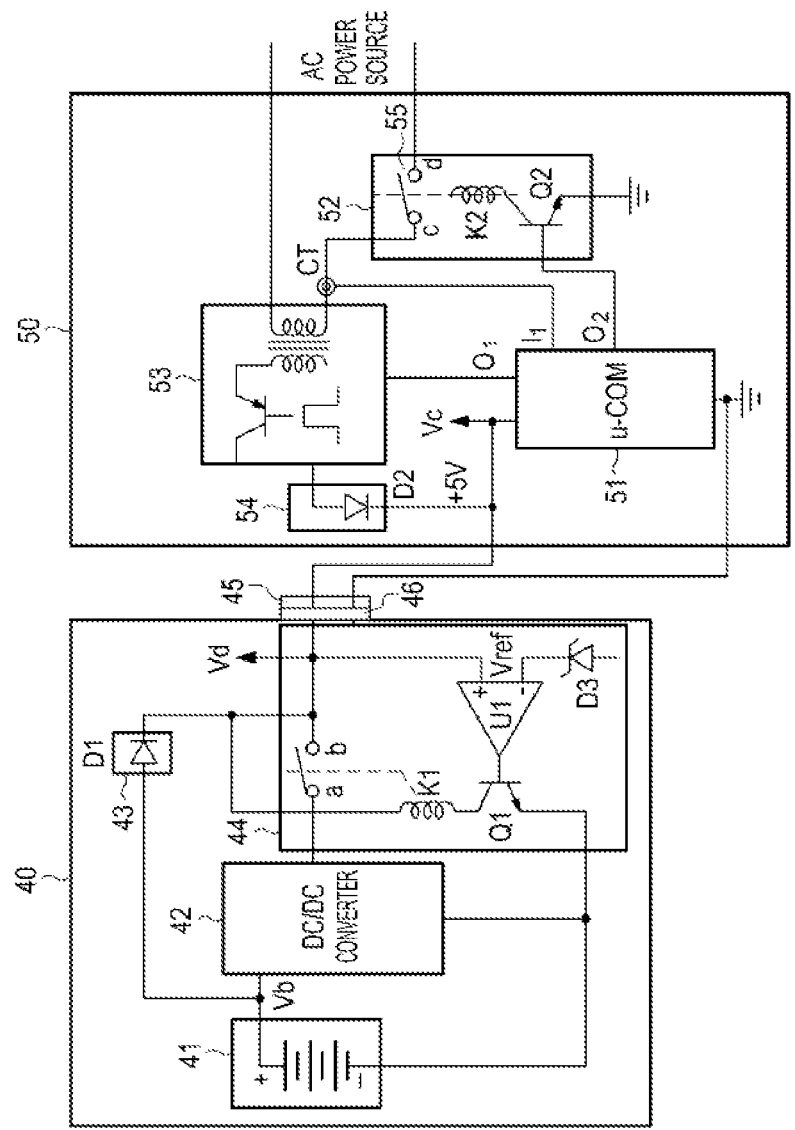
FIG. 2 is a circuit diagram exemplifying a circuit configuration of a power source device for cutting off standby power and a power source unit of a smartphone according to a second embodiment of the present invention.
Figure 3:
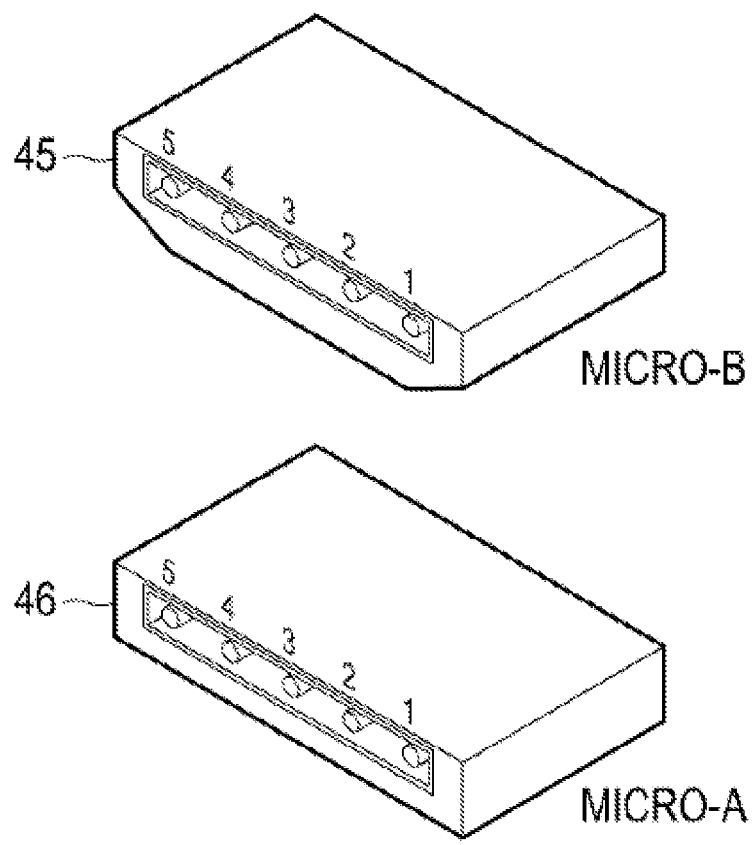
FIG. 3 is a view schematically exemplifying a configuration of a micro USB connector and a micro USB plug, which are international standards applied to a smartphone.

FIG. 2 is a circuit diagram exemplifying a circuit configuration of a power source device for cutting off standby power and a power source unit of a smartphone according to a second embodiment of the present invention.

Referring to FIG. 2, a configuration of a power source device according to the second embodiment of the present invention will be described as follows. The power source unit 40 of the smartphone according to the present invention includes a battery 41, a DC/DC converter 42 for supplying a charging voltage to the battery, a charging voltage supply unit 44 for determining whether a supplied voltage is a charging voltage or a battery voltage Vb and supplying or cutting off electric power to the DC/DC converter 42, a first backflow prevention unit 43 for preventing electric power from reversely flowing to the battery when a voltage of +5 V is supplied to a power source device 50, and a micro USB connector 46 for connection to the power source device 50. As shown in FIG. 2, the charging voltage supply unit 44 may include a comparator U1, a Zener diode D3, a transistor Q1, and a relay K1, and supplies a charging DC voltage Vd to the DC/DC converter 42 through the relay K1.

Meanwhile, the power source device 50 according to the present invention includes a micro USB plug 45 connected to the micro USB connector 46 as a passage for supplying charging power, a control unit 51 including a microprocessor μ-COM for controlling generation of electric power of the power source device 50 and detecting a charging state of the battery 41 to analyze, determine, and control the charging state, a power supply/cutoff unit 52 for supplying or cutting off electric power under the control of the control unit 51, and a power generation unit 53 for generating charging power supplied to charge the smartphone 40. The microprocessor μ-COM of the control unit 33 may be realized, for example, by using a low power microcomputer of Texas Instruments Inc. The power source device 50 further includes a current detection unit CT connected to an input terminal I1 of the control unit 51, for detecting a current of a charging AC supply power source to detect a charging state of the battery and providing the input terminal I1 with the detected current.

Now, an operational principle of the power source device according to the present invention will be described in detail as follows. First, in a process of normally operating the power source device 50 of which electric power is cut off by supplying electric power to the power source device 50, if the micro USB connector 46 and the micro USB plug 45 are connected to each other in the state in which input power of the power source device 50 is cut off, a voltage VB of the battery 41 of the smartphone 40 is supplied to the control unit 51 of the power source device 50 via a contact point b of the relay of the charging voltage supply unit 44 through the first backflow prevention unit 43 to operate the microprocessor μ-COM and an output O2 thereof is output to be high. Accordingly, the output O2 of the control unit 51 is high, the transistor Q2 of the power supply/cutoff unit 52 is turned on and a current flows through a coil of the relay K2 to be energized, so that contact points c and d are connected to each other such that AC input power is supplied to the power source device 50.

If AC input power is applied to the power source device 50, the control unit 51 controls generation of a voltage in the power generation unit 53 through a control signal of the output O1, and then generates an output voltage for charging, for example, +5 V through the second back flow prevention unit 54 to supply the output voltage to the power source device 10 of the smartphone. As described above, for example, a charging voltage of +5 V is supplied to the power source device 40 of the smartphone through the micro USB connector 46 and the micro USB plug 45, the comparator U1 in the charging voltage supply unit 44 compares a level of a voltage applied as an input with a predetermined reference value Vref, and as a result, in the case of +5 V, the transistor Q1 is turned on such that a current flows through a coil of the relay K1 to energize the relay K1 and accordingly, contact points a and b are connected to each other. In this way, a charging voltage of +5 V generated by the power generation unit 53 is supplied to the DC/DC converter 42 through the backflow prevention unit 54 so that the DC/DC converter 42 outputs charging voltage to the battery 41 of the smartphone to initiate a charging operation for the battery 11.

Next, a process of cutting off electric power of the power source device 50 when the battery 41 of the smartphone is fully charged will be described. As described above, if the battery 41 is completely charged by a charging voltage provided by the DC/DC converter 42 such that the battery 41 is in a fully charged state, a current value detected by the current detection unit CT is lowered, and the controller 51 continuously monitors the measurement result through the input terminal I1. As a result, when a level of a measured current input to the microprocessor μ-COM of the controller 21 reaches a fully charged current (for example, Isa) state, for example, a current value at an input terminal I1 becomes equal to or lower than a fully charged current Isa, it is determined that the battery is fully charged, and a coil of the relay K2 is deenergized by setting an output O2 of the microprocessor to be low and turning off the transistor Q2 of the power supply/cutoff unit 52 and standby power is perfectly cut off by separating the contact points c and d and cutting off input power for the power device 50. Then, the microprocessor μ-COM enters into a sleep mode, and for example, if a low power microprocessor (microcomputer) of Texas Instruments Inc. is used, power consumption in the sleep mode may be low enough to be ignored as described in the description of the first embodiment.

In addition, because a battery voltage Vb may be supplied to the DC/DC converter 42 as a voltage Vd through the first backflow prevention unit 43 such that the battery is discharged as a charging voltage of +5 V cannot be supplied if electric power to the power source device is cut off, and accordingly, in order to prevent this phenomenon, the comparator U1 of the charging voltage unit 44 determines that the battery voltage is lower than +5 V, turns off the transistor Q1, and deenergizes the coil of the relay K1 to separate the contact points a and b, and accordingly electric power is supplied from the battery to the DC/DC converter 12 to prevent discharging.

Here, if a low power comparator is used as the comparator U1, its power consumption is about 100 µA or less, and accordingly, if a natural amount of discharging of the battery is 1000 mAh, it takes about 10,000 hours (about 13 months) to completely discharge the battery, which may be ignored.

Figure 4:
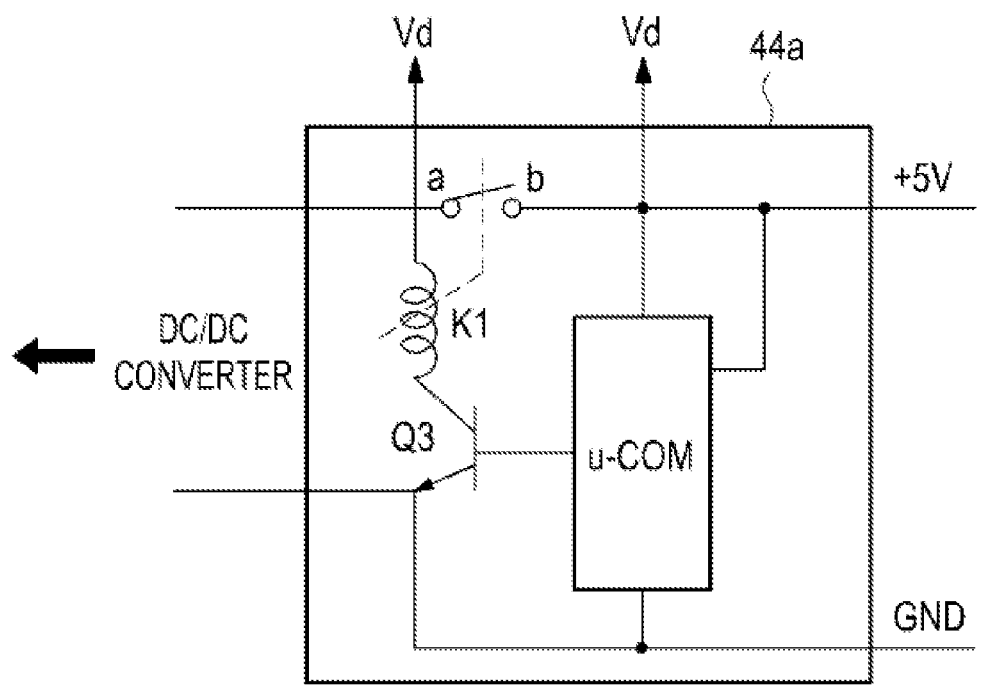
FIG. 4 is a view exemplifying an example of another configuration of a charging voltage supply unit of FIG. 2.

In addition, it may be appreciated by those skilled in the art that the comparator U1 may be replaced by a microcomputer µ-COM (preferably, a low power series product of Texas Instruments Inc.) and at least one transistor Q3 as in the configuration of 44a of FIG. 4 such that the contact points a and b are controlled to be separated and a sleep mode is started in realizing the charging voltage supply unit 44 in the second embodiment of FIG. 2.

Meanwhile, a control method applied to the case when the smartphone 40 is separated from the power source device 50 during a charging operation of the power source device according to the present invention will be described in detail. If the smartphone 40 is separated from the power source device 50 during a charging operation, a level lower than a fully charged current Isa is detected from the current detection unit CT of the power source device 50, and accordingly, the microprocessor µ-COM of the control unit 51 performs a control in a manner corresponding to the above-described fully charged state to completely cut off standby power of the power source device 50 by cutting off AC input power.

In addition, because the smartphone 40 is also controlled in the manner corresponding to the above-described fully charged state, unnecessary discharging of the battery can be prevented by cutting off electric power supplied to the DC/DC converter 42.

As described above, because unnecessary standby power of the power source device can be cut off during a charging operation of the smartphone by using only two wires of +5 V and GND of the micro USB connector for a smartphone (that is, in a two wire manner), that is, while a standard signal of an existing micro USB connector is still used, the smartphone may be charged and data may be downloaded by a USB terminal of a computer using existing DATA+, DATA−, and ID terminals.

Therefore, according to the present invention, electric power is automatically supplied to a power source device to charge the power source device if a smartphone is connected to a micro USB connector while a standard signal of an existing micro USB connector is still used, and if a product is separated from the power source device or a battery is fully charged, consumption of standby power can be substantially completely cut off by automatically cutting off input power of the power source device.

While the invention has been shown and described with reference to certain exemplary embodiments thereof, it will be understood by those skilled in the art that various changes in form and details may be made therein without departing from the spirit and scope of the invention as defined by the appended claims and equivalents thereof.

The invention claimed is:

1. A power source device for charging a battery of an external device, which has a standby power cutoff function, the power source device comprising a connector (24) for connection to a power source unit (20) when the battery of the external device is charged, and a power generation unit (32) for supplying DC charging power from an input power of the power source device to the external device (20), the power source device further comprising:

a control unit (33) comprising at least one microprocessor for controlling an overall operation and an overall function of the power source device (30);

a power supply/cutoff unit (34) for performing a function of supplying/cutting off input power of the power source device to and from the power generation unit (32) under the control of the control unit (33); and a current detection unit (CT) connected to the control unit (33), for sensing a current in the power supply/cutoff unit (34) and transmitting the sensed current to the control unit (33) to inform the control unit (33) of a charging state of the battery, wherein the power source device (30) comprises a second backflow preventing unit (31) connected between an output terminal of a DC charging voltage of the power generation unit (32) and a power voltage (Vc) of a microprocessor (µ-COM) of the control unit (33) for preventing a voltage (Vb) of the battery from being fed back to a DC/DC converter (23) through a first backflow prevention unit (22) when the input power to the power source device is cut off, wherein the control unit is configured to receive an operation power from the external device (20) through the connector (24) when the external device is connected to the power source device while the input power to the power source device is cut off, and then control the power supply/cutoff unit to perform a function of supplying an operation power, so that the battery of the external device is charged and the operation power of the control unit is supplied by the operation of the power generation unit, wherein the control unit is configured to identify the charging state of the battery by detecting the sensed current of the current detection unit, control the power supply/cutoff unit to perform a function of cutting off the input power of the power source device when the battery is charged, and wherein the power source unit (20) of the external device comprises: the battery (21): the DC/DC converter (23) as a unit for providing a charging voltage for the battery; and the first backflow prevention unit (22) connected between the battery (21) and the power voltage (Vc) of the microprocessor (µ-COM) of the control unit (33) via the connector (24), for preventing DC power from the power source device (30) from being directly applied to the battery (21) during charging of the battery, and wherein the first backflow prevention unit (22) comprises at least one diode (D1).

2. The power source device of claim 1, wherein the power supply/cutoff unit (34) is configured by combining at least one photo triac/triac (T1, T2), a photodiode (PD1), and/or a relay.

3. The power source device of claim 1, wherein the second backflow prevention unit (31) comprises at least one diode (D2).

4. The power source device of claim 1, wherein the power source device (30) controls an on/off state of a photodiode (PD1) according to an output signal from an output terminal (O2) of the microprocessor (µ-COM) of the control unit (33) whereby supply/cutoff of input power of the power source device to and from the power generation unit (32) is adjusted by controlling an on/off state of a triac (T1, T2).

5. A method of controlling a normal operation of a battery charging power source device comprising connector (24) connecting the battery of an external device to a power source unit (20) when the battery of the external device is charged, a power generation unit (32) for supplying DC charging power from an input power of the power source device to the external device (20), a control unit (33) comprising at least one microprocessor for controlling an overall operation and an overall function of the power source device (30), and a second backflow preventing unit (31) connected between an output terminal of a DC charging voltage of the power generation unit (32) and a power voltage (Vc) of the microprocessor of the control unit (33) for preventing a voltage (Vb) of the battery from being fed back to a DC/DC converter (23) through a first backflow prevention unit (22) when the input power to the power source device is cut off, wherein if a current detection unit (CT) of the power source device (30) senses a flowing current and inputs the sensed current to an input port (I1) of the control unit (33), the control unit determines that the battery is fully charged if the sensed current is lower than a predetermined level of a completely charged current, outputs an output (O2) of the control unit to be low, switches off a photodiode (PD1) of a power supply/cutoff unit (35), and performs a control to convert a state of a triac (T1, T2) into an open state, whereby standby power of the power source device (30) is cutoff by cutting off input power of the power source device, wherein the control unit is configured to receive an operation power from the external device (20) through the connector (24) when the external device is connected to the power source device while the input power to the power source device is cut off, and then control the power supply/cutoff unit to perform a function of supplying an operation power, so that the battery of the external device is charged and the operation power of the control unit is supplied by the operation of the power generation unit, wherein the control unit is configured to identify the charging state of the battery by detecting the sensed current of the current detection unit, control the power supply/cutoff unit to perform a function of cutting off the input power of the power source device when the battery is charged, and wherein the power source unit (20) of the external device comprises: the battery (21): the DC/DC converter (23) as a unit for providing a charging voltage for the battery: and the first backflow prevention unit (22) connected between the battery (21) and the power voltage (Vc) of the mircoprocessor (µ-COM) of the control unit (33) via the connector (24), for preventing DC power from the power source device (30) from being directly applied to the battery (21) during charging of the battery, and wherein the first backflow prevention unit (22) comprises at least one diode (D1).

\* \* \* \* \*